(12) United States Patent
Ahn et al.

(10) Patent No.: US 11,802,172 B2
(45) Date of Patent: Oct. 31, 2023

(54) COMPOSITION FOR SEEDED POLYMERIZATION, A SEED COPOLYMER AND A METHOD FOR PREPARING THE SAME

(71) Applicant: Korea Kumho Petrochemical Co., Ltd., Seoul (KR)

(72) Inventors: Du Seong Ahn, Daejeon (KR); Gwanghoon Kwag, Sejong-si (KR); Jae Kon Suh, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 231 days.

(21) Appl. No.: 16/661,696

(22) Filed: Oct. 23, 2019

(65) Prior Publication Data

US 2020/0172648 A1 Jun. 4, 2020

(30) Foreign Application Priority Data

Nov. 29, 2018 (KR) ........................ 10-2018-0150802

(51) Int. Cl.
| | |
|---|---|
| C08F 236/10 | (2006.01) |
| C08F 20/06 | (2006.01) |
| C08F 20/44 | (2006.01) |
| C08F 236/08 | (2006.01) |
| C08F 236/12 | (2006.01) |
| C08F 212/10 | (2006.01) |
| C08F 236/04 | (2006.01) |
| C08K 5/36 | (2006.01) |
| C08F 36/06 | (2006.01) |
| C08F 36/04 | (2006.01) |
| C08F 36/08 | (2006.01) |
| C08F 12/08 | (2006.01) |

(52) U.S. Cl.
CPC ............ *C08F 236/10* (2013.01); *C08F 20/06* (2013.01); *C08F 20/44* (2013.01); *C08F 212/10* (2013.01); *C08F 236/04* (2013.01); *C08F 236/045* (2013.01); *C08F 236/08* (2013.01); *C08F 236/12* (2013.01); *C08F 12/08* (2013.01); *C08F 36/04* (2013.01); *C08F 36/06* (2013.01); *C08F 36/08* (2013.01); *C08K 5/36* (2013.01)

(58) Field of Classification Search
CPC .... C08F 236/10; C08F 236/12; C08F 236/04; C08F 236/045; C08F 236/06; C08F 236/08; C08F 212/08; C08F 212/10; C08F 12/08; C08F 36/04; C08F 36/06; C08F 36/08; C08F 2438/03
See application file for complete search history.

(56) References Cited

U.S. PATENT DOCUMENTS

| | | | | |
|---|---|---|---|---|
| 2,547,150 A | * | 4/1951 | Blake ...................... | C08F 36/04 526/222 |
| 2011/0136980 A1 | * | 6/2011 | Pirra ......................... | C08F 2/38 428/407 |

FOREIGN PATENT DOCUMENTS

| | | | | |
|---|---|---|---|---|
| GB | 649104 A | * | 1/1951 | ............... C08F 36/04 |
| GB | 913590 A | * | 12/1962 | ............ C08F 279/02 |
| JP | 2004-018557 A | | 1/2004 | |
| JP | 2004-211089 A | | 7/2004 | |

(Continued)

*Primary Examiner* — Ling Siu Choi
*Assistant Examiner* — David L Miller
(74) *Attorney, Agent, or Firm* — NKL Law; Jae Youn Kim

(57) ABSTRACT

A composition for seeded polymerization includes: a compound having dithioate; a mercaptan compound; an aromatic vinyl monomer; and a conjugated diene monomer.

11 Claims, 18 Drawing Sheets

(56) References Cited

FOREIGN PATENT DOCUMENTS

| | | | |
|---|---|---|---|
| JP | 2011-529999 | A | 12/2011 |
| KR | 10-2000-0034196 | A | 6/2000 |
| KR | 10-2012-0022623 | A | 3/2012 |

\* cited by examiner

COMPOSITION FOR SEEDED POLYMERIZATION, A SEED COPOLYMER AND A METHOD FOR PREPARING THE SAME

CROSS-REFERENCE TO RELATED APPLICATION

This application claims the priority benefit of Korean Patent Application No. 10-2018-0150802, filed on Nov. 29, 2018 in the Korean Intellectual Property Office, the disclosure of which is incorporated herein by reference.

BACKGROUND OF THE DISCLOSURE

Field of the Disclosure

The present disclosure relates to a composition for seeded polymerization. More particularly, the present disclosure relates to a method for preparing a seed copolymer using a composition for seeded polymerization.

Description of the Related Art

Seeded polymerization is a method for growing polymers by synthesizing polymers of small uniform microparticles, and additionally introducing monomers using the synthesized polymers as a polymerization nucleus, i.e., seed. In general, the conversion rate is to reach 100% when synthesizing seeds. This is because seeded polymerization may be affected when a reaction stopper is introduced. The advantage of a conversion rate of 100% is that it becomes easier to introduce a third monomer. When a third monomer is introduced when preparing a seed, the conversion rate reaches 100%, and thus, there are no remaining monomers.

Emulsion styrene butadiene rubber synthesized by ordinary methods generates gel of ultra-high molecular weight upon reaching a conversion rate of a certain level or above since 1,3-butadiene, which is one of the monomers, has two double bonds. Accordingly, according to the conventional preparation method, after reacting up to a conversion rate of 70%, an additional process of collecting styrene and 1,3-butadiene, which are the remaining monomers, is carried out. However, in order to collect the remaining monomer of a third monomer which is used in a relatively small amount, the conventional preparation method requires an additional process and more time.

Such problem may be solved if a polymer is synthesized by introducing a third monomer in a seed after allowing the conversion rate to reach 100% when preparing a seed. However, when the conversion rate reaches 100%, gel is generated in the seed, and the gel present in a polymer decreases workability and dispersibility with the filler, thereby causing degradation of physical properties.

In general, particles with a diameter of 50 nm or less may be used as a seed. In particular, the seeded polymerization may be carried out more stably as the seed has a smaller and more uniform particle diameter. However, as to the seed prepared using the conventional polymerization method, the stability of the seeded polymerization deteriorates due to the presence of gel of ultra-high molecular weight or oligomer of low molecular weight.

The present disclosure has developed a method for preparing a seed with no gel by introducing reversible addition-fragmentation chain transfer (RAFT). The conventional seeded polymerization uses tert-dodecyl mercaptan (TDDM) of a thiol group as a molecular weight controller. Since 1,3-butadiene has two double bonds, seeds prepared in a manner that the conversion rate thereof is to be reached at 100% always include gel. When a reversible addition-fragmentation chain transfer agent instead of t-dodecyl mercaptan is introduced as a molecular weight controller in order to inhibit gel generation, gel is not generated; however, the reaction time gets longer, and it is difficult for the final conversion rate to reach 50% or above.

Korean Patent Laid-Open No. 10-2012-0022623 discloses a method for preparing a conjugated diene copolymer using a trithiocarbonate chain transfer agent as a reversible addition-fragmentation chain transfer agent. However, since the conjugated diene polymer needs to be grafted after preparing a vinyl polymer, the reaction process is complex. Also, since the conversion rate is less than 50%, which is low, an additional process is required for separating and purifying monomers. In addition, since the gel content of the copolymer is high and the diameter of the particles is not uniform, it is difficult to be used as a seed.

SUMMARY OF THE DISCLOSURE

The present disclosure has been made in view of the above problems, and an aspect of the present disclosure provides a composition for seeded polymerization capable of implementing high conversion rate and low gel content at the same time when preparing a styrene-butadiene seed copolymer, a seed copolymer prepared using the same, and a method for preparing the same.

Also, another aspect of the present disclosure provides a seed copolymer which has a small and uniform particle diameter.

According to an aspect of the present disclosure, the present disclosure provides a composition for seeded polymerization, comprising: a compound comprising dithioate; a mercaptan compound; an aromatic vinyl monomer; and a conjugated diene monomer.

According to an embodiment, the compound comprising dithioate may be represented by the following formulae 1 to 3:

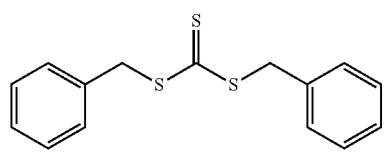

[Formula 1]

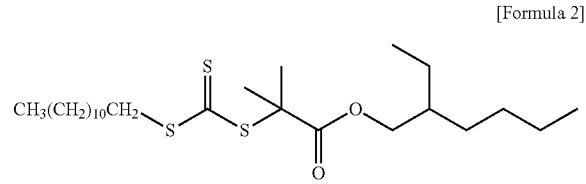

[Formula 2]

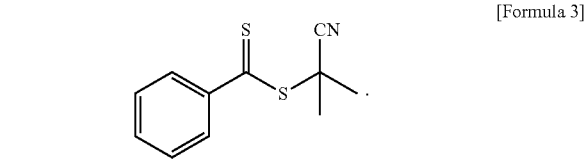

[Formula 3]

According to an embodiment, the mercaptan compound may be n-dodecyl mercaptan.

According to an embodiment, the mole ratio of the compound comprising dithioate and the mercaptan compound may be 1:0.5-1.5.

According to an embodiment, the aromatic vinyl monomer may be selected from the group consisting of styrene, α-methyl styrene, 2-methyl styrene, 3-methyl styrene, 4-methyl styrene, 2,4-dimethyl styrene, 2,4-diisopropyl styrene, 4-propyl styrene, 4-cyclohexyl styrene, 4-(p-methylphenyl)styrene, 5-tert-butyl-2-methyl styrene, tert-butoxy styrene, 2-tert-butyl styrene, 3-tert-butyl styrene, 4-tert-butyl styrene, N,N-dimethylaminoethyl styrene, 1-vinyl-5-hexyl naphthalene, 1-vinyl naphthalene, divinyl naphthalene, divinyl benzene, trivinyl benzene, vinyl benzyl dimethylamine, (4-vinyl benzyl)dimethyl amino ethyl ether, vinyl pyridine, vinyl xylene, diphenyl ethylene, diphenyl ethylene comprising tertiary amine, styrene comprising primary, secondary or tertiary amine, and a combination of two or more of the foregoing.

According to an embodiment, the conjugated diene monomer may be selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene and a combination of two or more of the foregoing.

According to an embodiment, the copolymer may further comprise a monomer comprising a functional group.

According to an embodiment, the monomer comprising the functional group may be one selected from the group consisting of glycidyl methacrylate, methyl methacrylate, acrylonitrile and a combination of two or more of the foregoing.

According to another aspect of the present disclosure, the present disclosure provides a seed copolymer, which is prepared by reacting the composition, and has an average particle diameter of 10-30 nm.

According to an embodiment, the copolymer may have a toluene-insoluble gen content of 10% or less.

According to another aspect of the present disclosure, the present disclosure provides a method for preparing a seed copolymer, comprising: (a) preparing a composition for seeded polymerization by mixing a compound comprising dithioate, a mercaptan compound, an aromatic vinyl monomer, and a conjugated diene monomer; and (b) reacting the composition for seeded polymerization.

According to an embodiment, the conversion rate of the aromatic vinyl monomer and the conjugated diene monomer may be 70% or above.

According to an embodiment, the mole ratio of the compound comprising dithioate and the mercaptan compound may be 1:0.5-1.5.

According to an embodiment, the composition in the step (a) may further comprise a monomer comprising a functional group.

According to an embodiment, the monomer comprising the functional group may be one selected from the group consisting of glycidyl methacrylate, methyl methacrylate, acrylonitrile and a combination of two or more of the foregoing.

According to an embodiment, the step (a) may be carried out by continuous introduction.

According to an embodiment, the step (b) may be carried out for 12-30 hours.

DETAILED DESCRIPTION OF THE DISCLOSURE

Figure 1A:
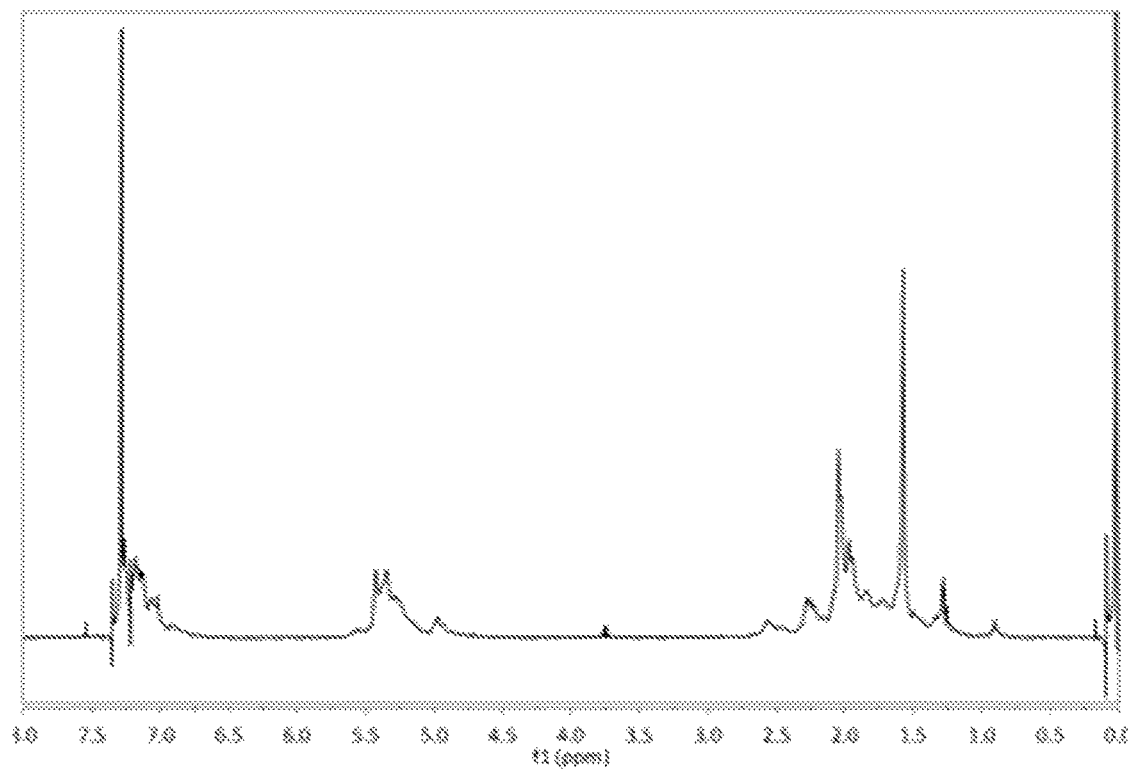
FIGS. 1(a)-(c), 2(a)-(c), 3(a)-(c), 4(a)-(c), 5(a)-(c), 6(a)-(c) and 7(a)-(c) are results analyzing the seed copolymers prepared by examples 1 to 7 of the present disclosure by (a) nuclear magnetic resonance, (b) gel permeation chromatography, and (c) particle sizer, respectively.

Exemplary embodiments of the present disclosure are described in detail with reference to the accompanying drawings. However, the present disclosure may be implemented in various different forms and thus is not limited to these embodiments. In the drawings, to clearly describe the present disclosure, a part not relevant to the description is omitted, and like reference numerals in the specification denote like elements.

In the specification, when it is described that a certain part is "connected" to another part, it should be understood that the certain part may be directly connected to another part or indirectly connected to another part via another member in the middle. In addition, when a certain part "includes" a certain component, this indicates that the part may further include another component instead of excluding another component unless specifically stated otherwise.

When ranges of numerical values are described in the present specification, unless otherwise stated, the numerical values have the precision of the number of significant figures provided following the standard protocol in chemistry for significant figures. For example, 10 encompasses a range from 5.0 to 14.9, whereas the number 10.0 encompasses a range from 9.50 to 10.49.

Hereinafter, embodiments of the present disclosure are described in detail with reference to the accompanying drawings.

Composition for Seeded Polymerization

A composition for seeded polymerization according to an aspect of the present disclosure may comprise: a compound comprising dithioate; a mercaptan compound; an aromatic vinyl monomer; and a conjugated diene monomer.

As used herein, "seeded polymerization" means a polymerization method growing particles by additionally reacting homo or hetero monomers using a pre-polymerized emulsion polymer of microparticles as a polymerization nucleus. "Composition for seeded polymerization" means a composition to be used for the polymerization of a polymerization nucleus that is an emulsion polymer of microparticles, that is, a seed polymer, required for the seeded polymerization.

The compound comprising dithioate may be represented by the following formula 4, and may serve as a reversible addition-fragmentation chain transfer agent.

[Formula 4]

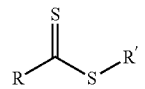

In the above formula, R and R' may have nitrogen (N), oxygen (O), and sulfur (S) atoms substituted in a $C_1$-$C_{20}$ alkyl group, an aryl group, an aralkyl group or a part of the foregoing. For example, when R or R' has nitrogen substituted in the alkyl group, it may be a nitrile group, when oxygen is substituted, it may be an alkoxy group, and when sulfur is substituted, it may be a sulfanyl group, but is not limited thereto.

Preferably, the compound comprising dithioate may be represented by the following formulae 1 to 3, and more preferably, may be a compound represented by the following formula 1.

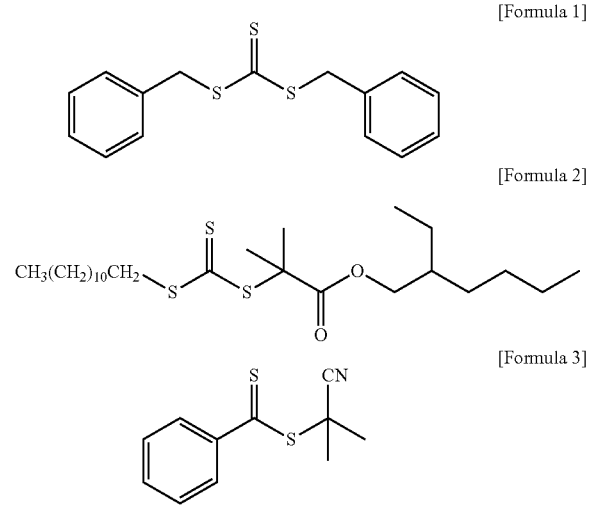

[Formula 1]

[Formula 2]

[Formula 3]

The mercaptan compound means a compound comprising a sulfanyl group (—S—H). For example, the mercaptan compound may be ethyl-2-mercapto ethyl propionate, 2-mercapto ethyl propionate, 2-mercapto ethanol, mercapto acetic acid, n-octyl mercaptan, n-dodecyl mercaptan, t-dodecyl mercaptan, etc., and preferably n-dodecyl mercaptan, but is not limited thereto.

Conventionally, thiol t-dodecyl mercaptan was used for preparing the seed polymer. However, the present disclosure may implement high conversion rate and low gen content simultaneously by using a compound comprising dithioate and a mercaptan compound at the same time.

In particular, the mole ratio of the compound comprising dithioate and the mercaptan compound may be 1:0.5-1.5, and preferably 1:0.9-1.1. When the mole ratio between the compounds deviates from the above range, it would be difficult to achieve the effect of the present disclosure which implements high conversion rate and low gel content simultaneously.

The aromatic vinyl monomer may be selected from the group consisting of styrene, α-methyl styrene, 2-methyl styrene, 3-methyl styrene, 4-methyl styrene, 2,4-dimethyl styrene, 2,4-diisopropyl styrene, 4-propyl styrene, 4-cyclohexyl styrene, 4-(p-methylphenyl)styrene, 5-tert-butyl-2-methyl styrene, tert-butoxy styrene, 2-tert-butyl styrene, 3-tert-butyl styrene, 4-tert-butyl styrene, N,N-dimethylaminoethyl styrene, 1-vinyl-5-hexyl naphthalene, 1-vinyl naphthalene, divinyl naphthalene, divinyl benzene, trivinyl benzene, vinyl benzyl dimethylamine, (4-vinyl benzyl)dimethyl amino ethyl ether, vinyl pyridine, vinyl xylene, diphenyl ethylene, diphenyl ethylene comprising tertiary amine, styrene comprising primary, secondary or tertiary amine, and a combination of two or more of the foregoing, but is not limited thereto.

The conjugated diene monomer may be selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene and a combination of two or more of the foregoing, and preferably, may be 1,3-butadiene, but is not limited thereto.

The composition may further comprise a monomer comprising a functional group. For example, the monomer may be a single molecule with one functional group selected from the group of functional groups such as alcohol group, sulfide group, sulfone group, carboxyl group, amine group, aldehyde group, silane group, acryl group, etc. or may be selected from a monomer group such as vinyl pyridine, ethylene epoxide, ethylene sulfide, dialkyl amino alkyl styrene, dialkyl amino alkyl methacrylate, hexamethyl cyclotrisiloxane, etc., and preferably glycidyl methacrylate, methyl methacrylate, acrylonitrile, but is not limited thereto. The monomer comprising the functional group may function as a third monomer, thereby remarkably improving the physical property of the final product even in a small amount.

The composition may further comprise an emulsifier, a solvent and a surfactant. Any emulsifier, solvent and surfactant may be used if they are used for the conventional emulsion polymerization.

Seed Copolymer

A seed copolymer according to another aspect of the present disclosure may be prepared by reacting the composition, and the average particle diameter may be 10-30 nm, and preferably 15-25 nm.

The toluene-insoluble gel content of the copolymer may be less than 10%. Gel content was measured according to the following method.

After precipitating the solid of the polymerized copolymer using methanol and drying the precipitated solid in an oven, 0.1 g of the solid was sufficiently dissolved in 20 ml of toluene. The solution in which the solid was dissolved was filtered using a filter paper, and then the filtrate was heated to completely evaporate toluene. Then, the weight ($W_2$) of the solid remaining was measured. The gel content was calculated by comparing the weight ($W_2$) with the weight ($W_1$) of the initial solid. The equation is as shown in the following equation 1.

$$\text{Gel Content}(\%) = \frac{W_1 - W_2}{W_1} \times 100(\%) \qquad \langle \text{Equation 1} \rangle$$

The conventional seed copolymer has a conversion rate of less than 60% when the average particle diameter satisfies the above range, and the gel content exceeds 10% and the average particle diameter cannot be satisfied when the conversion rate satisfies 70% or above. In comparison, the seed copolymer of the present disclosure is prepared to have a high conversion rate of 70% or above, and has a uniformly small average particle diameter and a low gel content, thereby remarkably improving the property of the mixed rubber prepared therefrom.

Method for Preparing Seed Copolymer

A method for preparing a seed copolymer according to another aspect of the present disclosure may comprise: (a) preparing a composition for seeded polymerization by mixing a compound comprising dithioate, a mercaptan compound, an aromatic vinyl monomer, and a conjugated diene monomer; and (b) reacting the composition for seeded polymerization.

The types of aromatic vinyl monomer and conjugated diene monomer, and the effect thereof are the same as described above.

Using the preparation method, the respective conversion rates of the aromatic vinyl monomer and the conjugated diene monomer may be 70% or above, preferably 90% or above, and more preferably 100%.

By copolymerizing an aromatic vinyl monomer and a conjugated diene monomer together with the compound comprising dithioate and the mercaptan compound, the preparation method may implement high conversion rate, low gel content, and small and uniform average particle diameter. Here, the mole ratio of the compound comprising dithioate and the mercaptan compound may be 0.5-1.5.

The composition in the step (a) may further comprise a monomer comprising a functional group, and the type and effect thereof are the same as described above. The conversion rate of the monomer comprising the functional group may be 100%.

The method for preparing a copolymer using the conventional emulsion polymerization requires an additional process for collecting the remaining monomer in order to introduce a monomer comprising a functional group, i.e., third monomer, thereby raising the processing cost. However, according to the present disclosure, a seed copolymer with high conversion rate is prepared, and the monomer comprising a functional group may be introduced, without a separate collecting process, by reacting the seed copolymer and the monomer. Also, the copolymer of the present disclosure has low gel content, and the particles prepared have a small and uniform average diameter, thereby ensuring high stability during seeded polymerization, and the property of the final product prepared therefrom may be remarkably improved.

The step (a) may be carried out by continuous introduction, but is not limited thereto. The step (a) may be carried out by batch introduction, semi-batch introduction or continuous introduction which may be used for general emulsion polymerization by a person skilled in the art.

The step (b) may be carried out for 12-30 hours, and preferably for 16-24 hours.

Hereinafter, examples of the present disclosure are described in more detail. However, the experimental results in the following show only representative experimental results of the examples, and the scope and contents of the present disclosure cannot be construed to be reduced or limited by the examples and the like. Each effect of the various embodiments of the present disclosure not expressly set forth below will be specifically described in a relevant section.

The structure of a reversible addition-fragmentation chain transfer agent used in the examples below is illustrated by the following formulae 1 to 3:

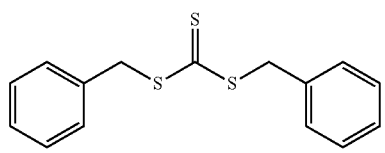

[Formula 1]

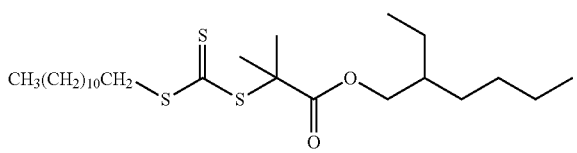

[Formula 2]

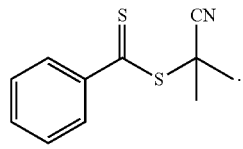

[Formula 3]

Example 1

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, 1.4 g of the compound of formula 1, and 1.1 g of n-dodecyl mercaptan were continuously introduced and stirred for 16 hours to obtain a seed copolymer.

Example 2

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, 1.8 g of the compound of formula 1, and 1.1 g of n-dodecyl mercaptan were continuously introduced and stirred for 24 hours to obtain a seed copolymer.

Example 3

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, 1.4 g of the compound of formula 1, and 0.9 g of n-dodecyl mercaptan were continuously introduced and stirred for 20 hours to obtain a seed copolymer.

Example 4

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, 2.3 g of the compound of formula 2, and 1.1 g of n-dodecyl mercaptan were continuously introduced and stirred for 20 hours to obtain a seed copolymer.

Example 5

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, 1.1 g of the compound of formula 3, and 1.1 g of n-dodecyl mercaptan were continuously introduced and stirred for 20 hours to obtain a seed copolymer.

Example 6

In a 2 L pressure reactor at 10-20° C., 750 mL of water, 60 g of sodium rosin acid, 100 g of sodium fatty acid, 144 g of styrene, 180 g of 1,3-butadiene, 36 g of glycidyl methacrylate, 0.8 g of methane hydroperoxide, 0.09 g of EDTA, 0.04 g of ferrous sulfate, 0.2 g of sodium hydrosulfate, 1.4 g of the compound of formula 1, and 1.1 g of n-dodecyl mercaptan were continuously introduced and stirred for 17 hours to obtain a seed copolymer.

Example 7

In a 2 L pressure reactor at 10-20° C., 750 mL of water, 60 g of sodium rosin acid, 100 g of sodium fatty acid, 144 g of styrene, 180 g of 1,3-butadiene, 36 g of acrylonitrile, 0.8 g of methane hydroperoxide, 0.09 g of EDTA, 0.04 g of ferrous sulfate, 0.2 g of sodium hydrosulfate, 1.4 g of the compound of formula 1, and 1.1 g of n-dodecyl mercaptan were continuously introduced and stirred for 17 hours to obtain a seed copolymer.

Comparative Example 1

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, and 3.0 g of the compound of formula 1 were continuously introduced and stirred for 16 hours to obtain a seed copolymer.

Comparative Example 2

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, and 2.1 g of n-dodecyl mercaptan were continuously introduced and stirred for 16 hours to obtain a seed copolymer.

Experimental Example

In order to confirm the properties of the seed copolymer prepared in the examples and comparative examples, nuclear magnetic resonance (NMR), gel permeation chromatography (GPC), a particle sizer and gel-content experiments are used for analysis, and the results are shown in tables 1 and 2 below.

1) Nuclear Magnetic Resonance (NMR)

After precipitating the solid of the polymerized copolymer using methanol and drying the precipitated solid in an oven, 10 mg of the solid was sufficiently dissolved in 10 ml of deuterated chloroform ($CDCl_3$). A part thereof was moved to an NMR tube to be measured under a condition of 400 MHz using the L-65 model of Bruker.

2) Gel Permeation Chromatography (GPC)

After precipitating the solid of the polymerized copolymer using methanol and drying the precipitated solid in an oven, 10 mg of the solid was sufficiently dissolved in 10 ml of tetrahydrofuran (THF). 1.5 ml thereof was moved to a GPC vial to be measured for 40 minutes using the e9625 model of Waters.

3) Particle Sizer

After sufficiently shaking 0.5 g of the polymerized copolymer in 10 ml of distilled water, a part thereof was moved to a particle sizer cell to be measured using the Zen3660 model of Malvern.

4) Gel Content Measurement

After precipitating the solid of the polymerized copolymer using methanol and drying the precipitated solid in an oven, 0.1 g of the solid was sufficiently dissolved in 20 ml of toluene. The solution in which the solid was dissolved was filtered using a filter paper, and then the filtrate was heated to completely evaporate the toluene. Then, the weight ($W_2$) of the solid remaining was measured. The gel content was calculated by comparing the weight ($W_2$) with the weight ($W_1$) of the initial solid. The equation is as shown in the following equation 1.

$$\text{Gel Content}(\%) = \frac{W_1 - W_2}{W_1} \times 100(\%) \quad \langle\text{Equation 1}\rangle$$

TABLE 1

Figure 1B:
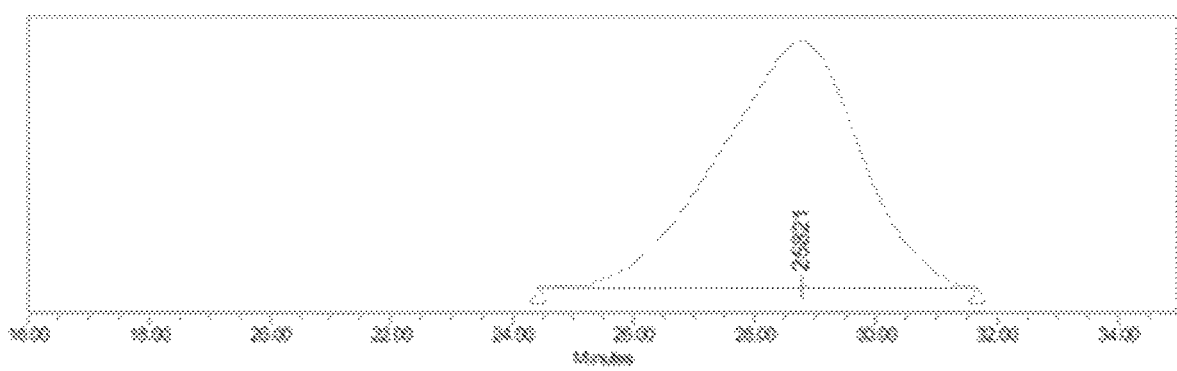
Figure 1C:
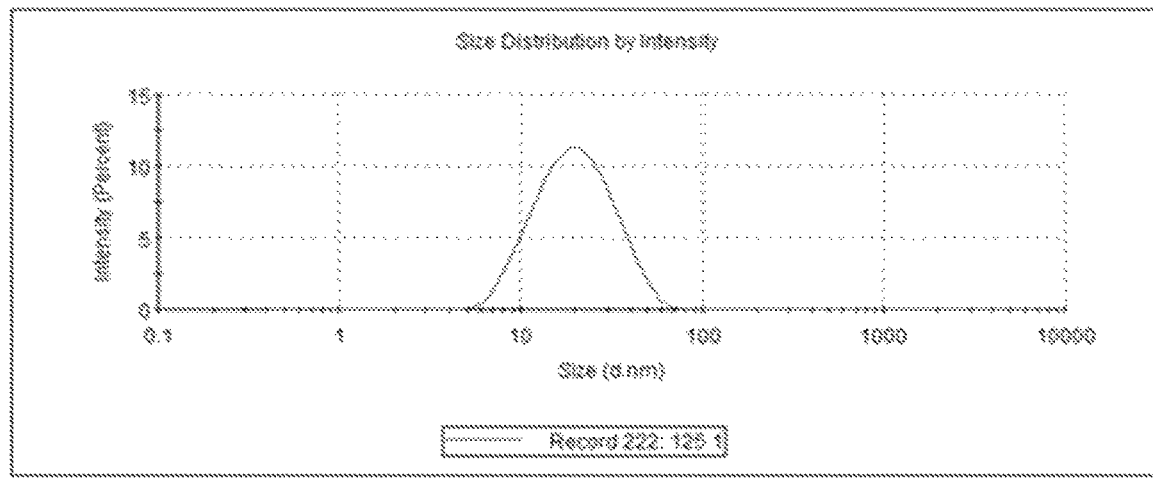
Figure 2A:
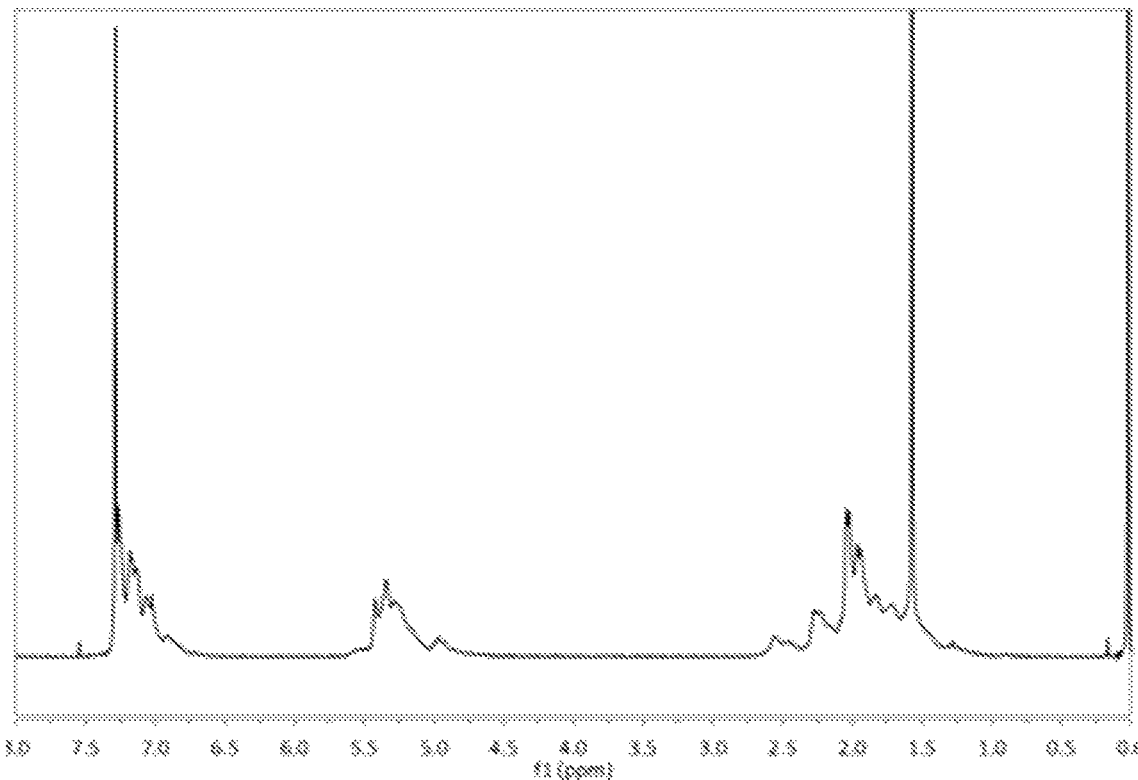
Figure 2B:
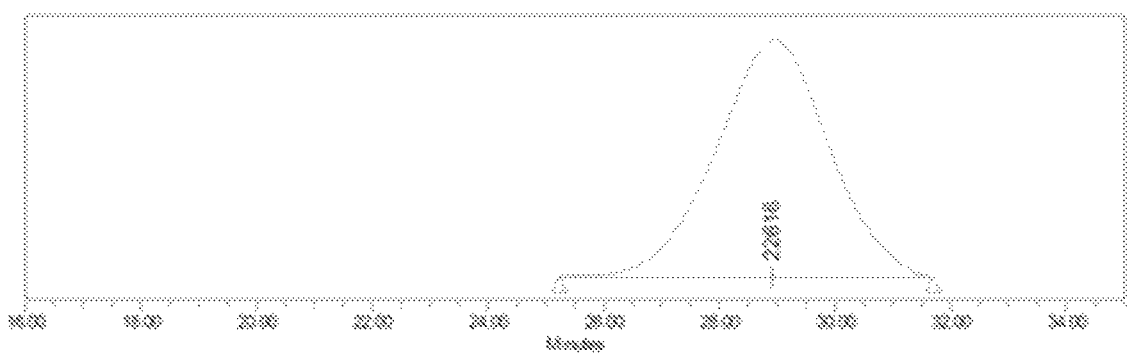
Figure 2C:
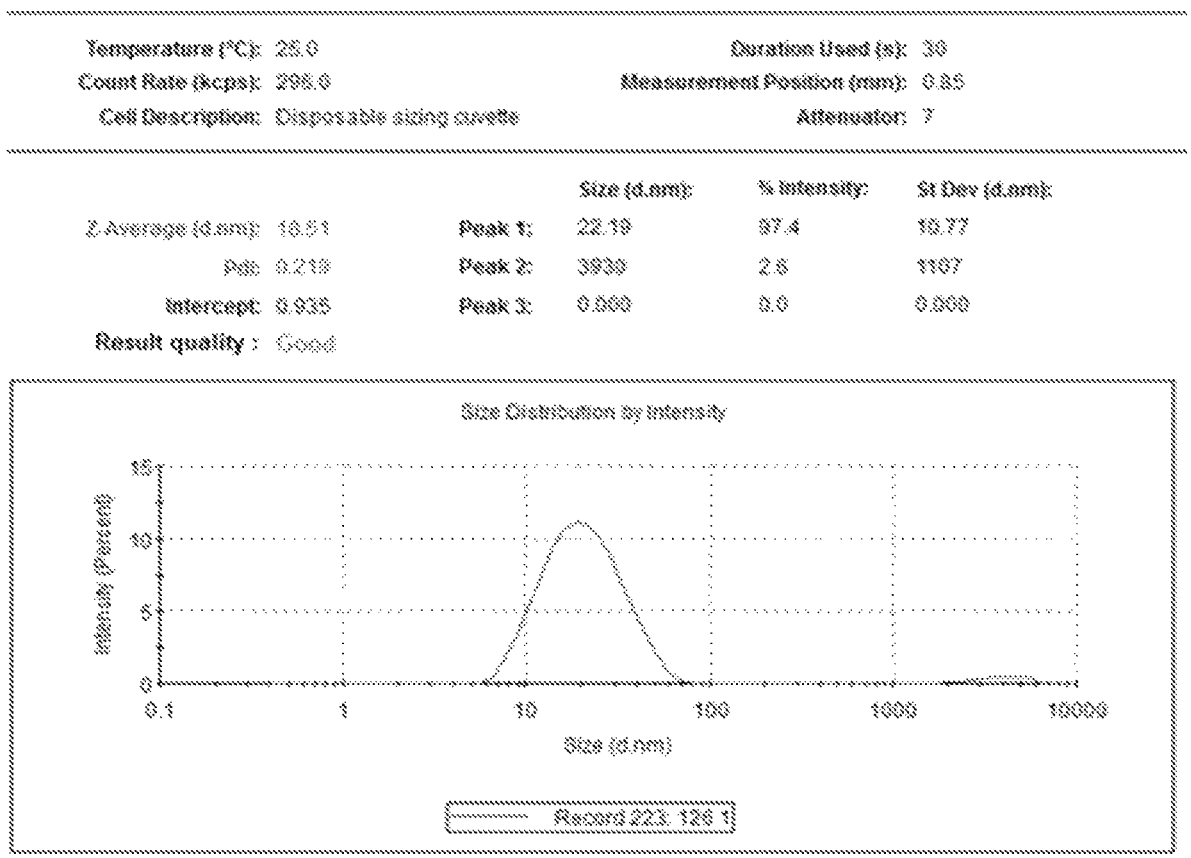
Figure 3A:
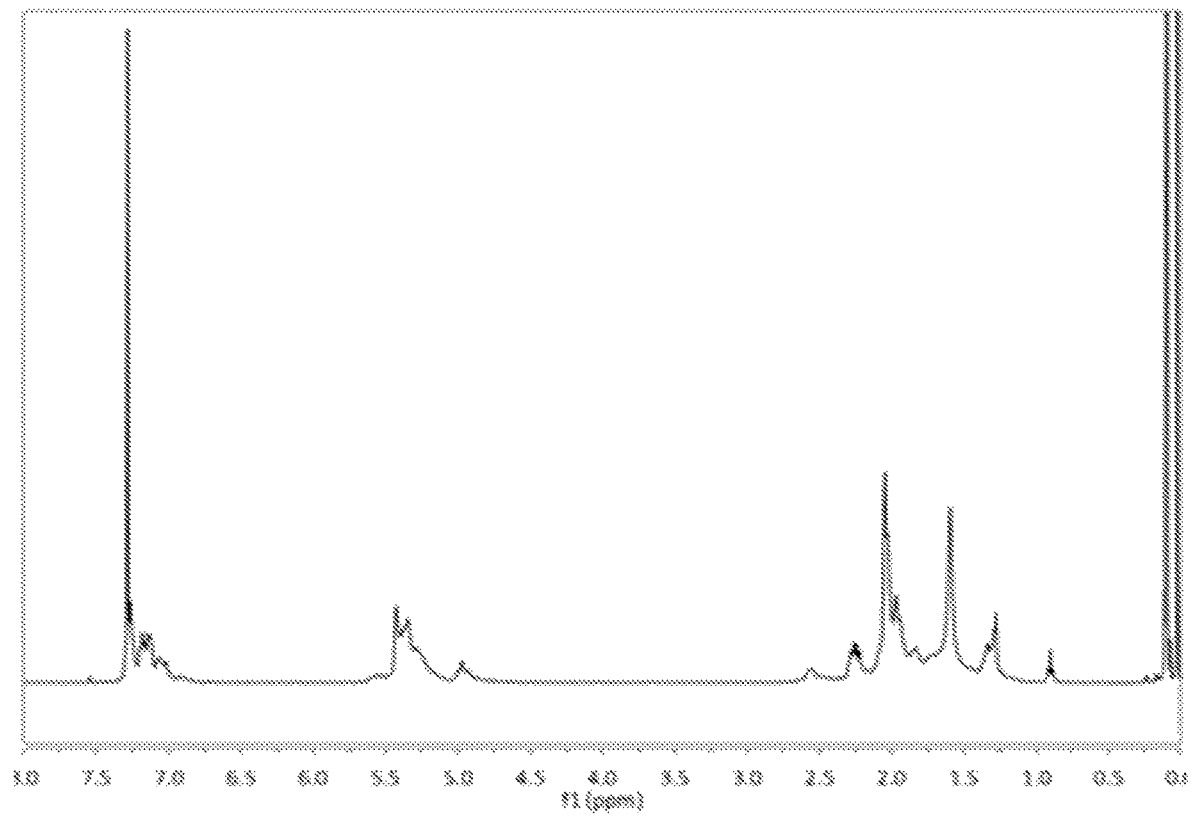
Figure 3B:
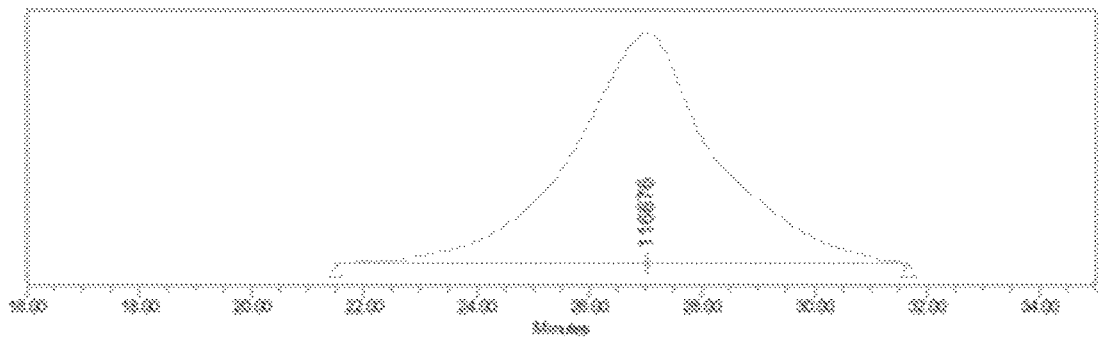
Figure 3C:
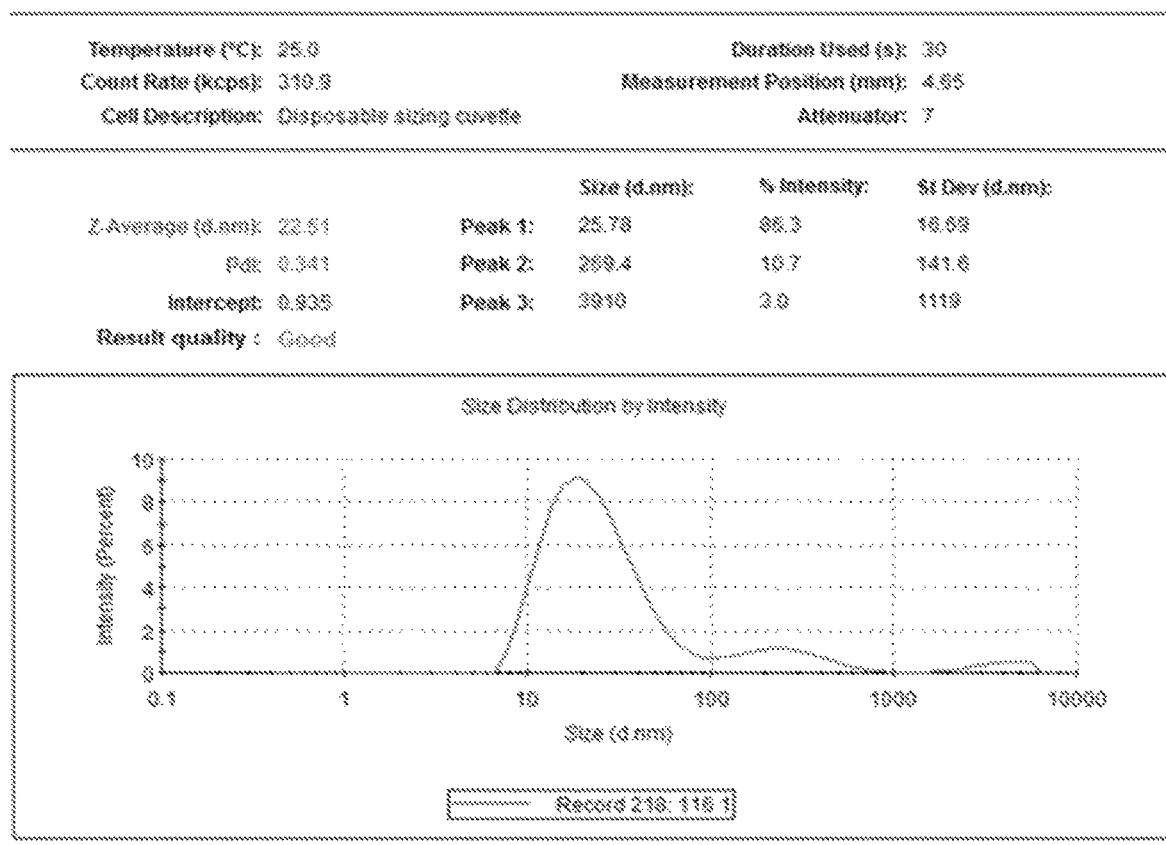
Figure 4A:
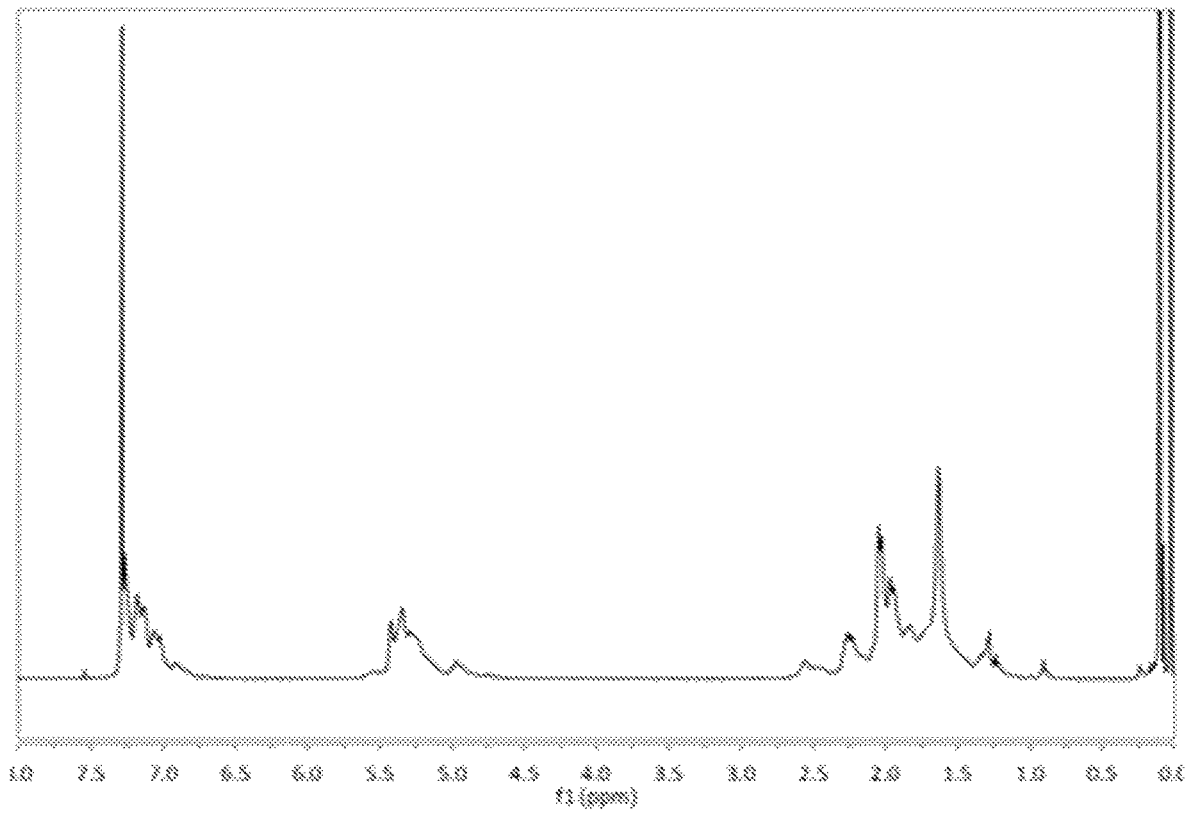
Figure 4B:
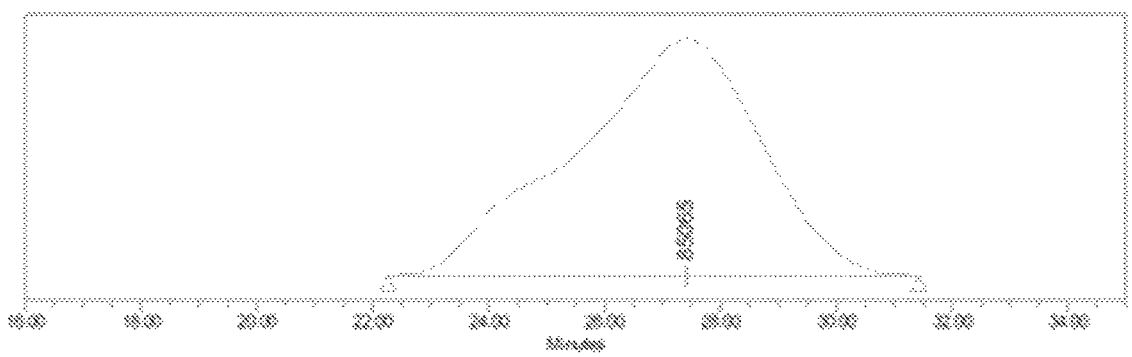
Figure 4C:
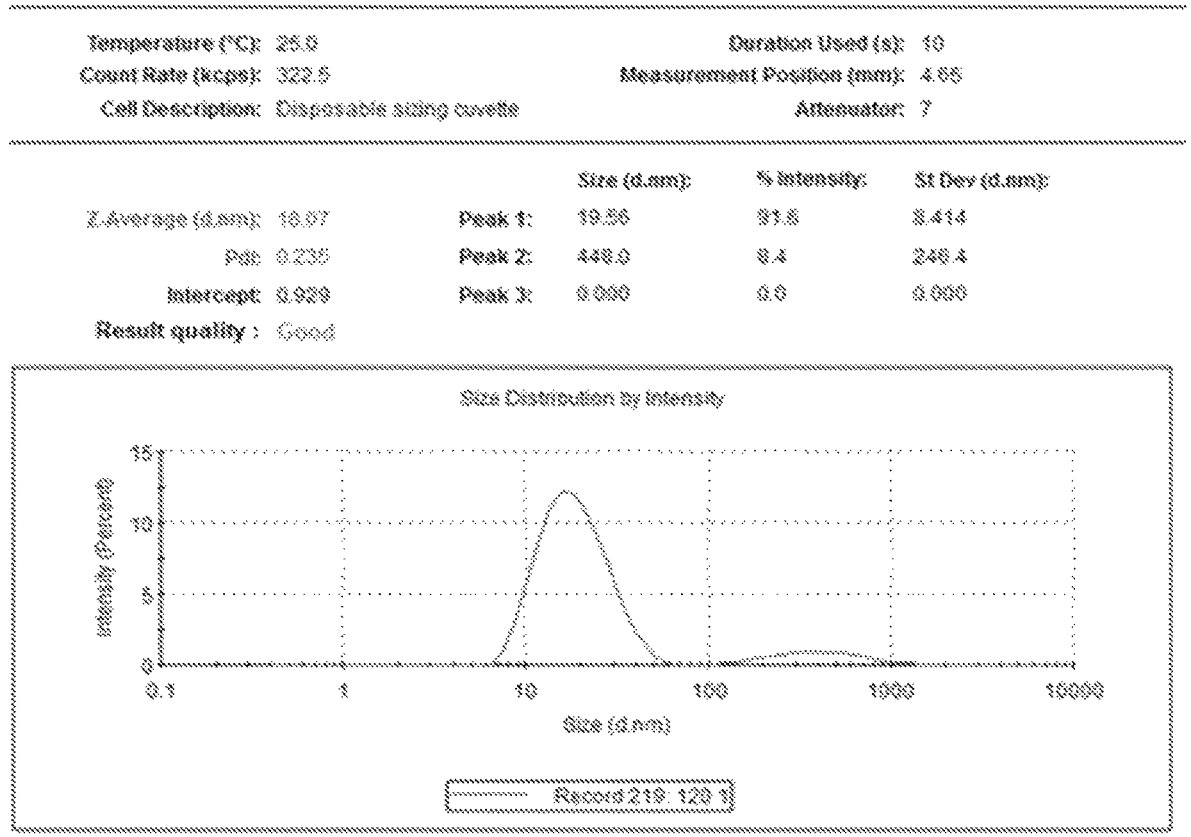
Figure 5A:
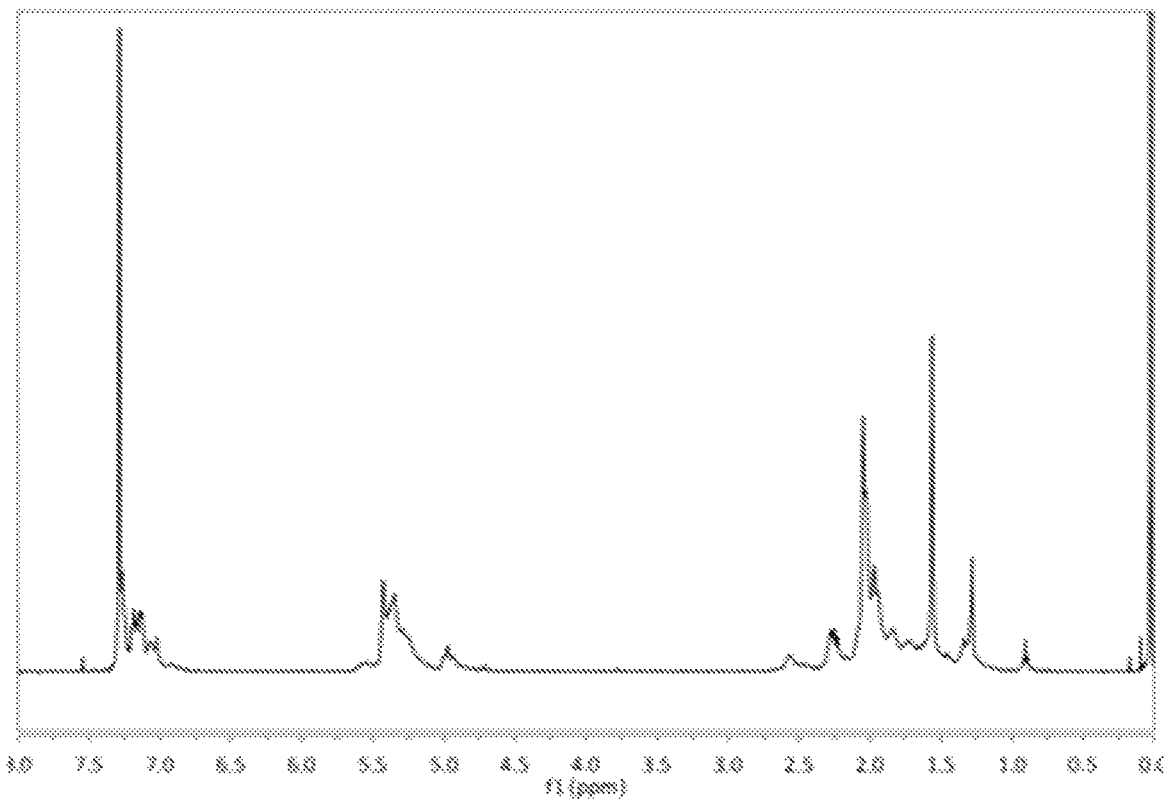
Figure 5B:
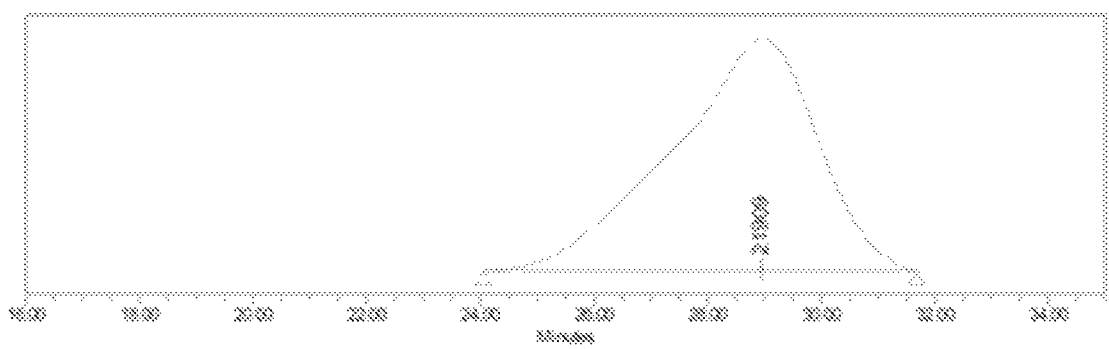
Figure 5C:
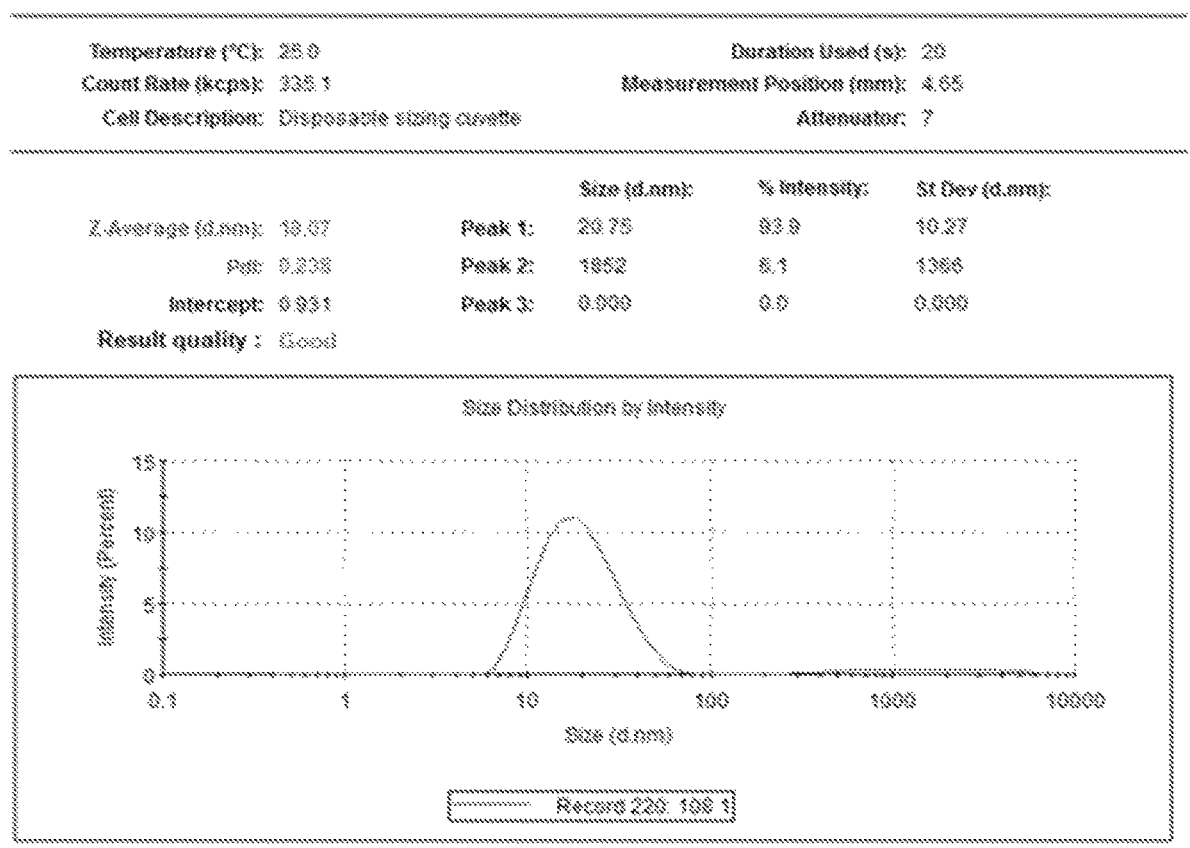
Figure 6A:
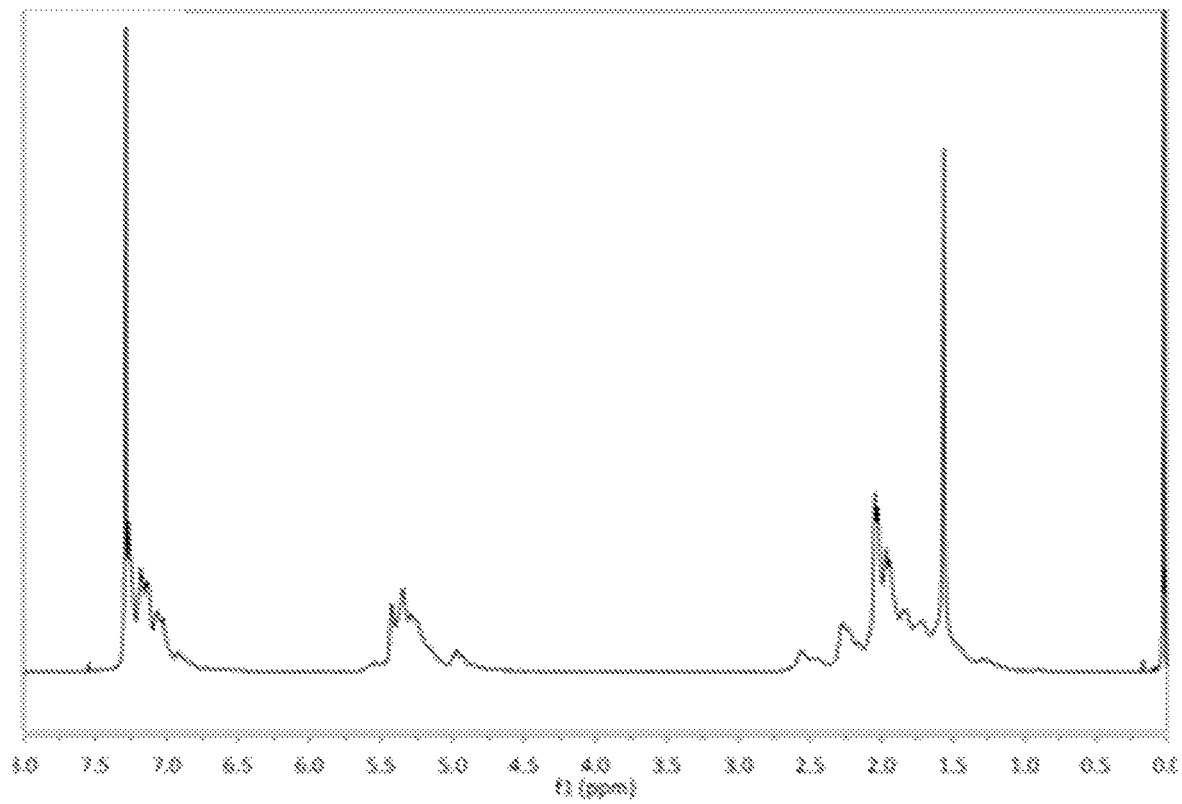
Figure 6B:
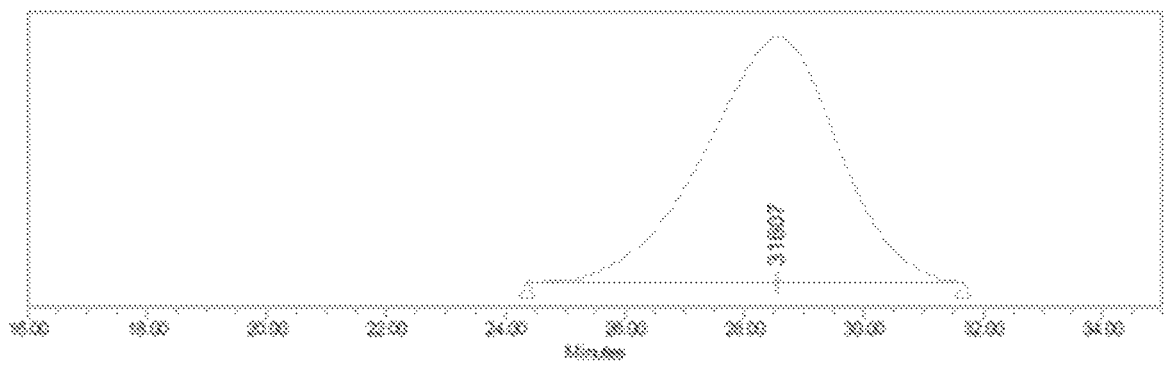
Figure 6C:
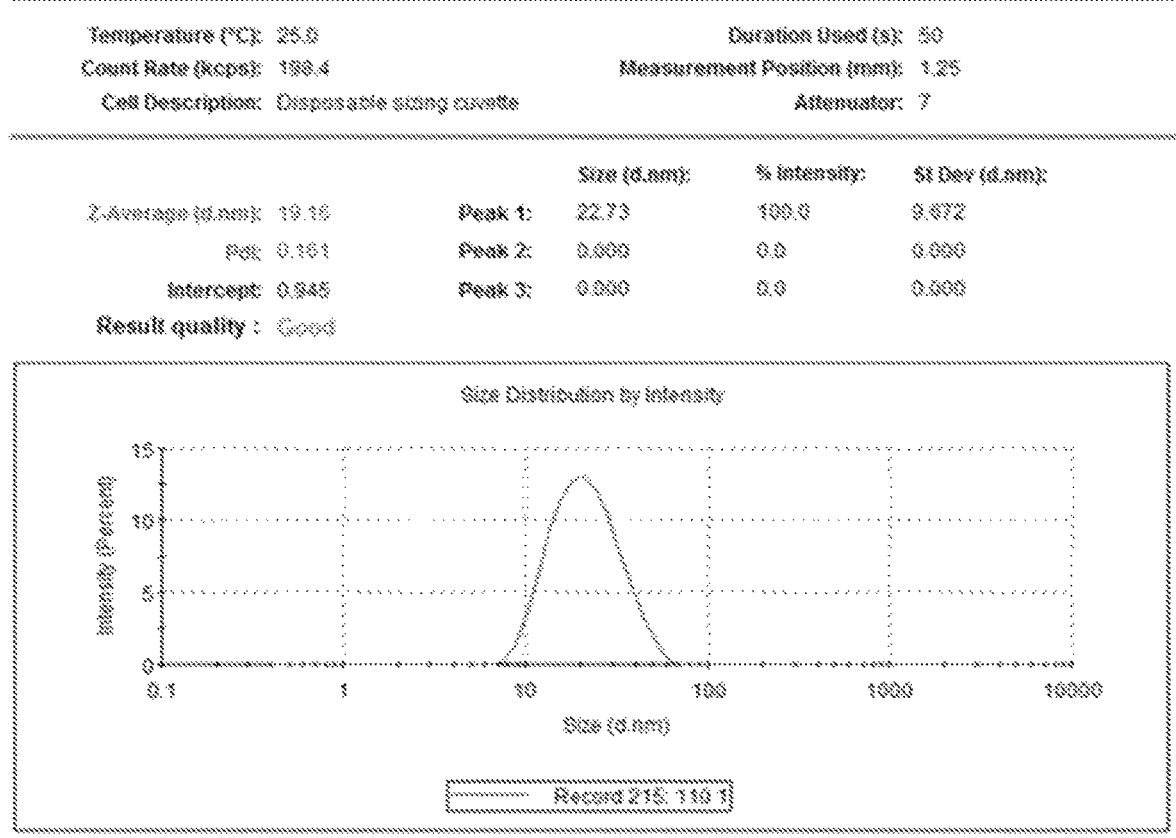
Figure 7A:
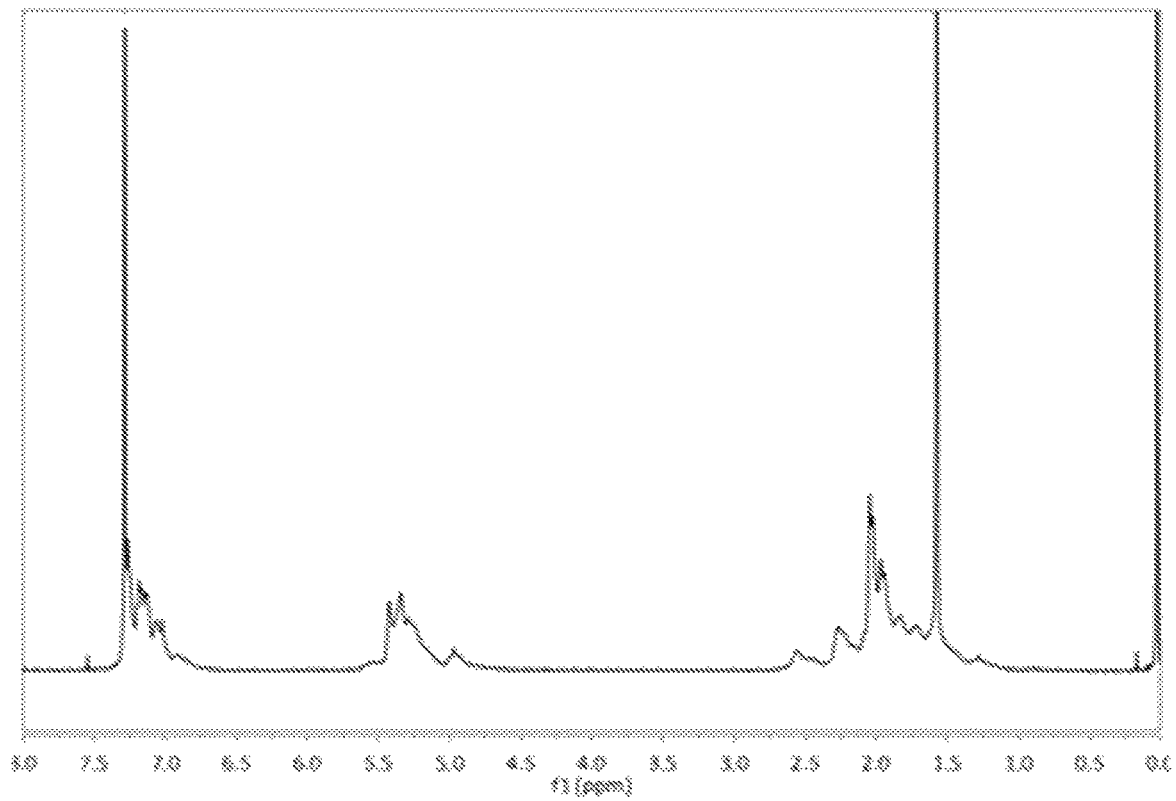
Figure 7B:
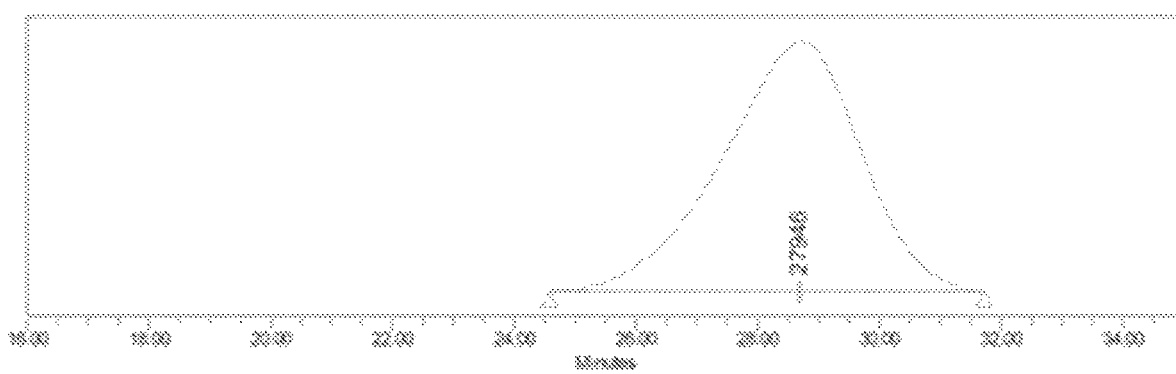
Figure 7C:
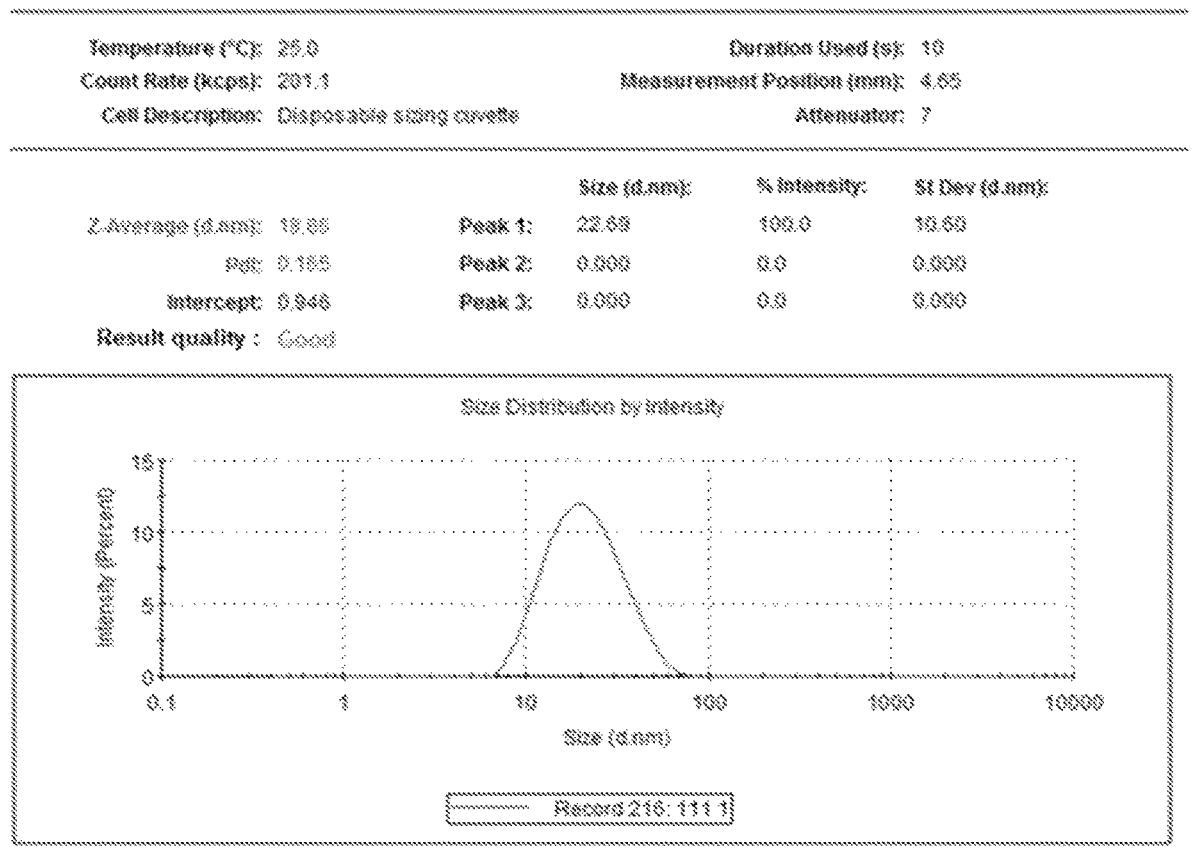
Figure 8A:
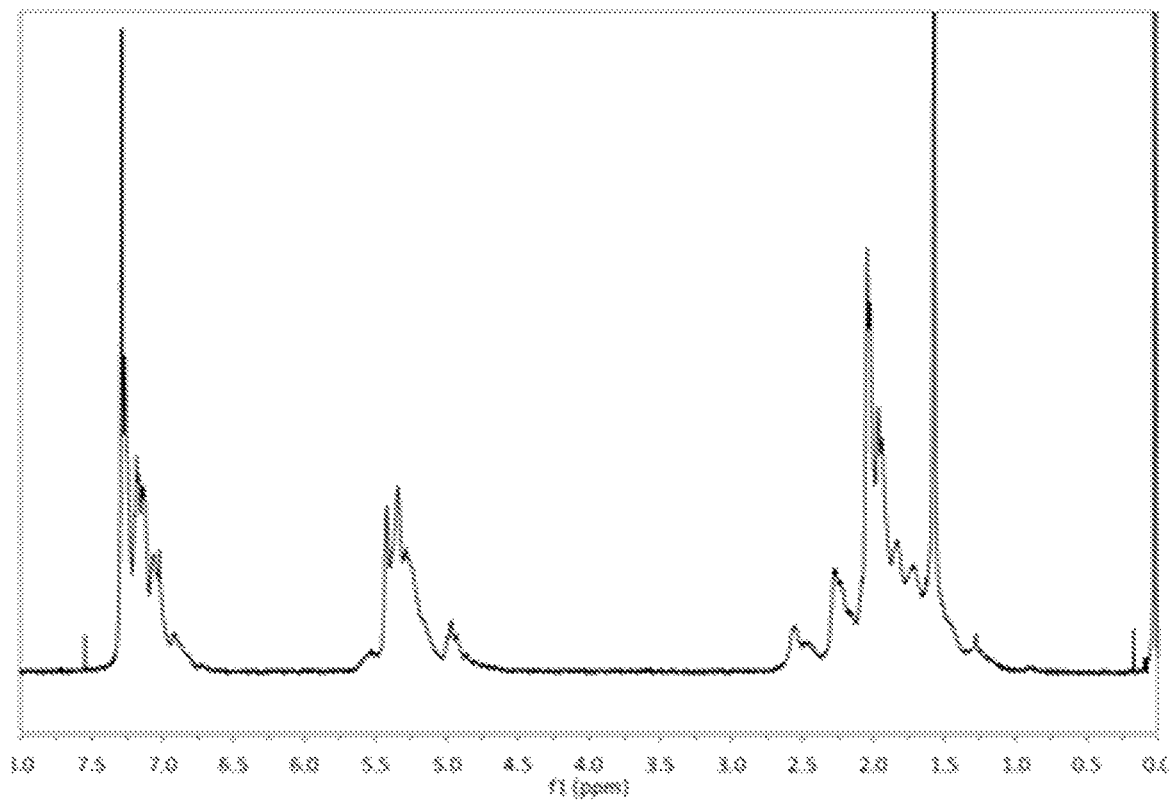
FIGS. 8(a)-(c) and 9(a)-(c) are results analyzing the seed copolymers prepared by comparative examples 1 and 2 of the present disclosure by (a) nuclear magnetic resonance, (b) gel permeation chromatography, and (c) particle sizer, respectively.
Figure 8B:
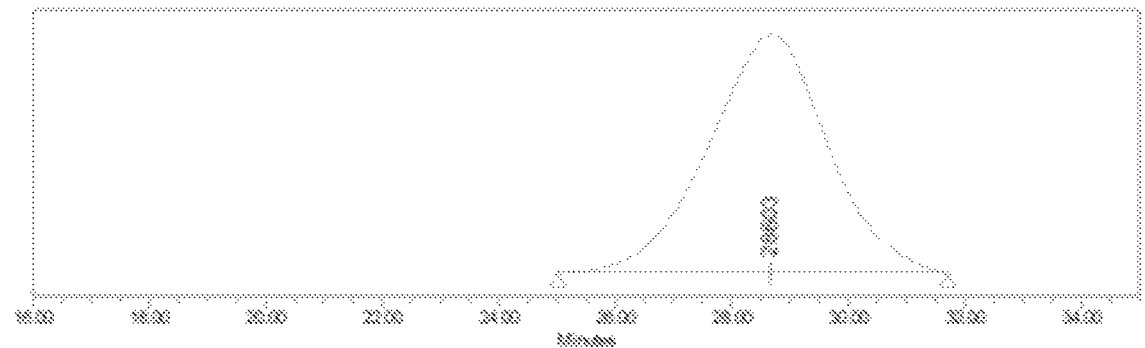
Figure 8C:
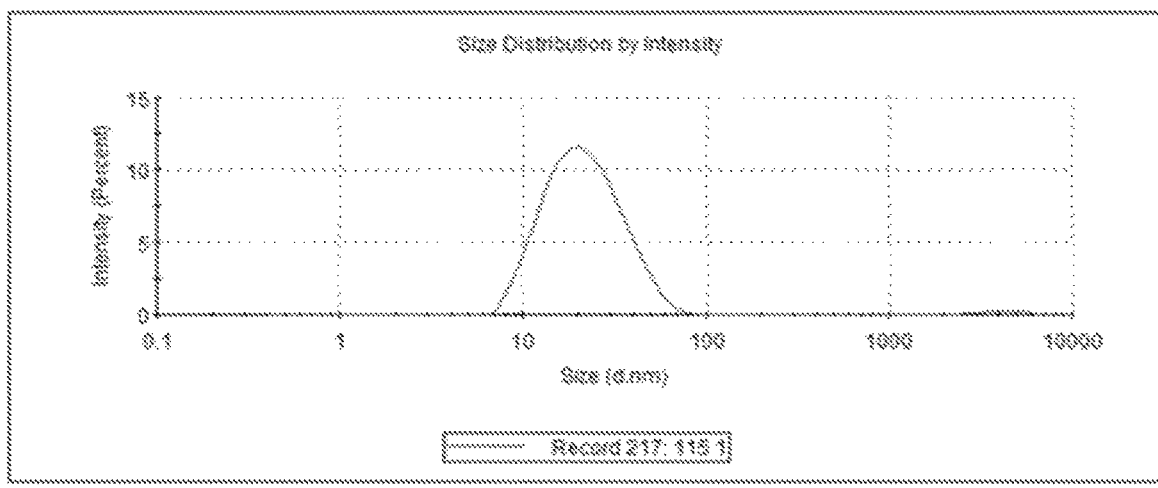
Figure 9A:
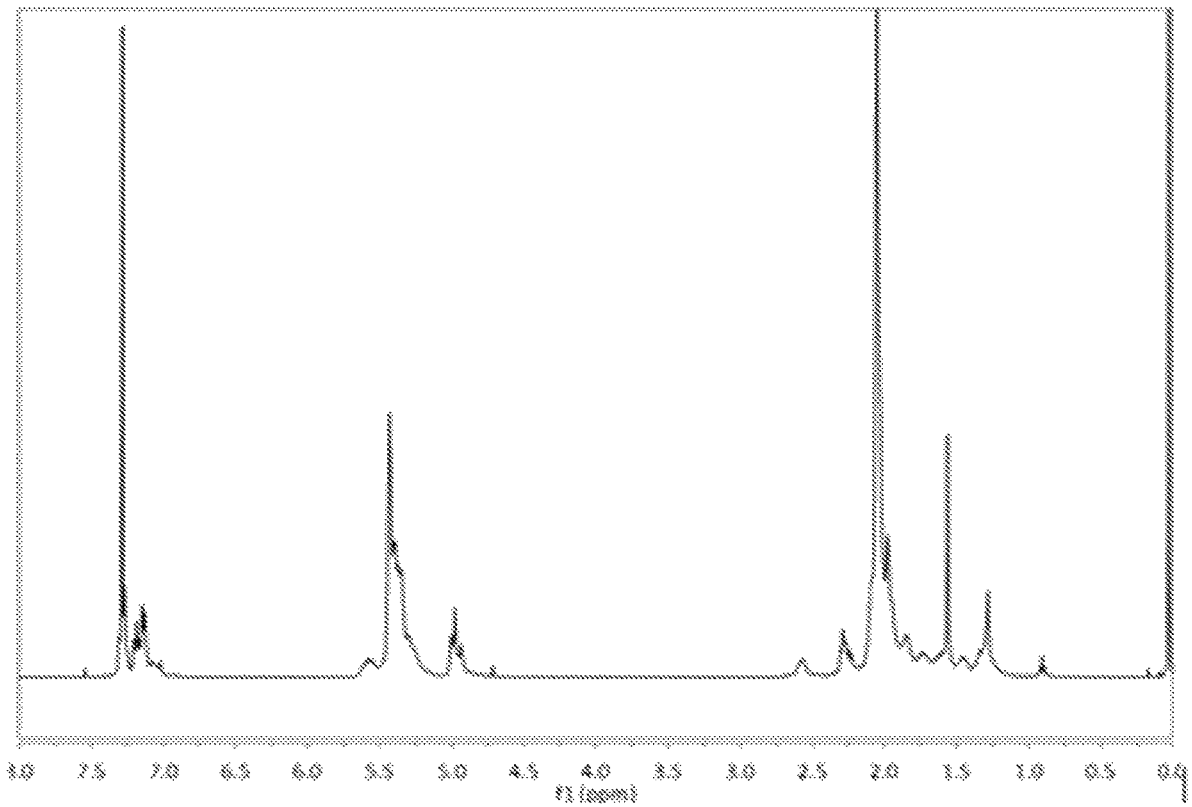
Figure 9B:
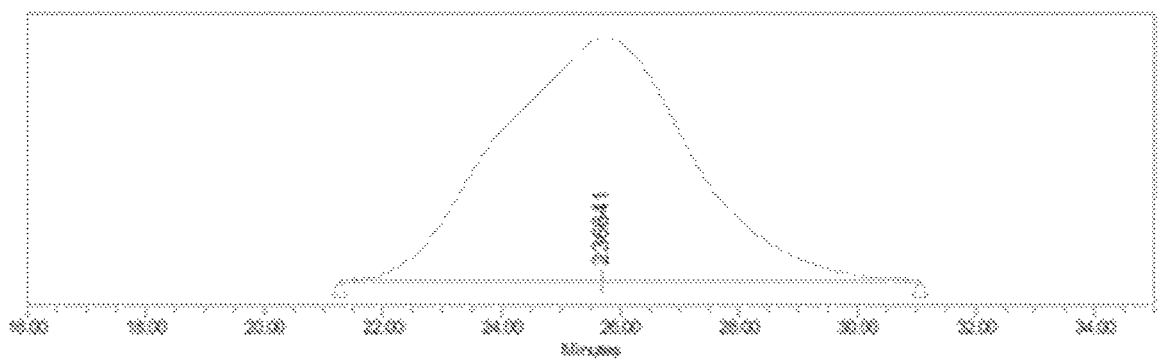
Figure 9C:
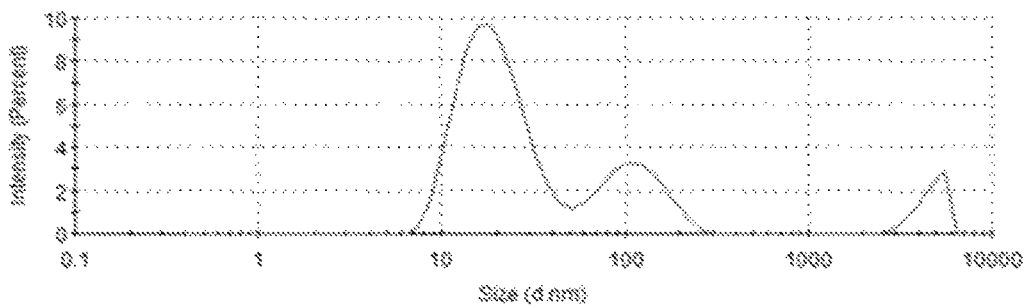

|  | NMR | GPC | Particle sizer |
|---|---|---|---|
| Example 1 | FIG. 1(a) | FIG. 1(b) | FIG. 1(c) |
| Example 2 | FIG. 2(a) | FIG. 2(b) | FIG. 2(c) |
| Example 3 | FIG. 3(a) | FIG. 3(b) | FIG. 3(b) |
| Example 4 | FIG. 4(a) | FIG. 4(b) | FIG. 4(b) |
| Example 5 | FIG. 5(a) | FIG. 5(b) | FIG. 5(c) |
| Example 6 | FIG. 6(a) | FIG. 6(b) | FIG. 6(c) |
| Example 7 | FIG. 7(a) | FIG. 7(b) | FIG. 7(c) |
| Comparative example 1 | FIG. 8(a) | FIG. 8(b) | FIG. 8(c) |
| Comparative example 2 | FIG. 9(a) | FIG. 9(b) | FIG. 9(c) |

TABLE 2

|  | Molecular weight (g/mol) | Gel content (%) | Average particle diameter (nm) | Conversion rate (%) |
|---|---|---|---|---|
| Example 1 | 51,715 | 0 | 17.47 | 100.0 |
| Example 2 | 32,337 | 0 | 18.51 | 78.1 |
| Example 3 | 209,240 | 7.4 | 22.51 | 100.0 |
| Example 4 | 237,582 | 3.2 | 18.07 | 100.0 |
| Example 5 | 61,046 | 2.8 | 18.07 | 100.0 |
| Example 6 | 54,926 | 0 | 19.16 | 100.0 |
| Example 7 | 52,145 | 0 | 18.86 | 100.0 |
| Comparative example 1 | 42,950 | 0 | 19.36 | 52.3 |
| Comparative example 2 | 394,929 | 19.2 | 28.28 | 100.0 |

Referring to table 2 above, it is confirmed that examples 1 to 5, which use the compound of formulae 1 to 3 and n-dodecyl mercaptan together, prepare a copolymer having an average particle diameter between 18.07 and 22.51 nm, while implementing a conversion rate of 70% or above and simultaneously controlling the gel content to be less than 10%, and thus they are advantageous for seeded polymerization. In particular, the seed copolymer in example 1 where the mole ratio of the compound of formula 1 and n-dodecyl mercaptan is 1:1 has a gel content of 0% at a conversion rate of 100%, and thus has excellent workability and dispersibility with the filler during the seeded polymerization of emulsion styrene butadiene rubber using the same.

Also, examples 6 and 7, which introduce glycidyl methacrylate and acrylonitrile as a third monomer, also maintain a gel content of 0% at a conversion rate of 100%, and prepare a copolymer having a small and uniform average particle diameter of 18.86 nm and 19.16 nm. Thus, they are advantageous for seeded polymerization, and the third monomer could improve physical properties of the final product.

In comparison, comparative example 1 which uses only a reversible addition-fragmentation chain transfer agent has a bad conversion rate of 52.3%, and thus requires an additional process for collecting the remaining monomers. An additional experiment was carried out extending the reaction time in comparative example 1 to 24 hours, but the conversion rate could not exceed 60%.

Comparative example 2, which uses n-dodecyl mercaptan alone, has an average particle diameter of 39 nm, and a gel content of 19.2% which is high, thereby causing the property of the rubber prepared to be inferior when applied to seeded polymerization. An additional experiment was carried out extending the reaction time in comparative example 2 to 24 hours, but the gel content exceeded 30%, and thus the copolymer could not be used as a seed.

According to an aspect of the present disclosure, high conversion rate and low gel content may be implemented at the same time when preparing a seed copolymer.

Also, according to another aspect of the present disclosure, the present disclosure may provide a method for preparing a seed copolymer which has a small and uniform particle diameter.

It should be understood that the effects of the present disclosure are not limited to the effects described above, but include all effects that can be deduced from the detailed description of the present disclosure or the constitution of the disclosure described in the claims.

The aforementioned description of the present disclosure is provided by way of example and those skilled in the art will understand that the present disclosure can be easily changed or modified into other specified forms without change or modification of the technical spirit or essential characteristics of the present disclosure. Therefore, it should be understood that the aforementioned examples are only provided by way of example and not provided to limit the present disclosure. For example, each of constituents described as a single form may be separately implemented and, similarly, constituents described as being separated may be implemented in a combined form.

It should be understood that the scope of the present disclosure is defined by the following claims and the disclosure is to cover all modifications, equivalents, and alternatives falling within the spirit and scope of the disclosure as defined by the claims.

What is claimed is:

1. A composition for seeded polymerization, comprising:
   a compound comprising dithioate;
   a mercaptan compound;
   a vinyl aromatic monomer; and
   a conjugated diene monomer,
wherein the compound comprising dithioate is represented by one of the following formulae 2 to 3:

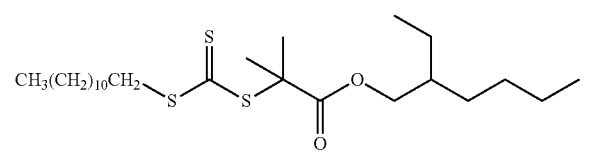

[formula 2]

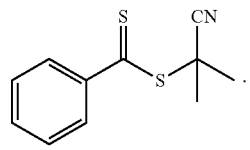

[formula 3]

wherein the mercaptan compound is n-dodecyl mercaptan, and the mole ratio of the compound comprising dithioate and the mercaptan compound is 1:0.5-1.5.

2. The composition for seeded polymerization of claim 1, wherein the aromatic vinyl monomer is selected from the group consisting of styrene, α-methyl styrene, 2-methyl styrene, 3-methyl styrene, 4-methyl styrene, 2,4-dimethyl styrene, 2,4-diisopropyl styrene, 4-propyl styrene, 4-cyclohexyl styrene, 4-(p-methylphenyl)styrene, 5-tert-butyl-2-methyl styrene, tert-butoxy styrene, 2-tert-butyl styrene, 3-tert-butyl styrene, 4-tert-butyl styrene, N,N-dimethylaminoethyl styrene, 1-vinyl-5-hexyl naphthalene, 1-vinyl naphthalene, divinyl naphthalene, divinyl benzene, trivinyl benzene, vinyl benzyl dimethylamine, (4-vinyl benzyl)dimethyl amino ethyl ether, vinyl pyridine, vinyl xylene, diphenyl ethylene, diphenyl ethylene having at least one aromatic ring substituted with tertiary amino group, styrene having the aromatic ring substituted with primary, secondary or tertiary amino group, and a combination of two or more of the foregoing.

3. The composition for seeded polymerization of claim 1, wherein the conjugated diene monomer is selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, and a combination of two or more of the foregoing.

4. The composition for seeded polymerization of claim 1, wherein the composition further comprises a monomer comprising a functional group.

5. The composition for seeded polymerization of claim 4, wherein the monomer comprising the functional group is one selected from the group consisting of glycidyl methacrylate, methyl methacrylate, acrylonitrile and a combination of two or more of the foregoing.

6. A method for preparing a seed copolymer, comprising:
   (a) preparing a composition for seeded polymerization by mixing a compound comprising dithioate, a mercaptan compound, an aromatic vinyl monomer, and a conjugated diene monomer; wherein the compound comprising dithioate is represented by one of the following formulae 2 to 3:

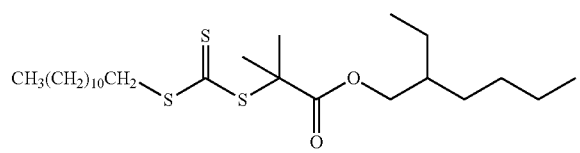

[formula 2]

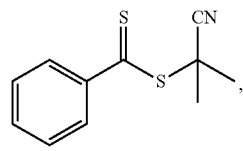

[formula 3]

wherein the mercaptan compound is n-dodecyl mercaptan, and the mole ratio of the compound comprising dithioate and the mercaptan compound is 1:0.5-1.5, and (b) reacting the composition for seeded polymerization.

7. The method of claim 6, wherein the conversion rate of the aromatic vinyl monomer and the conjugated diene monomer is 70% or above.

8. The method of claim 6, wherein the composition in the step (a) further comprises a monomer comprising a functional group.

9. The method of claim 8, wherein the monomer comprising the functional group is one selected from the group consisting of glycidyl methacrylate, methyl methacrylate, acrylonitrile and a combination of two or more of the foregoing.

10. The method of claim 6, wherein the step (a) is carried out by continuous introduction.

11. The method of claim 6, wherein the step (b) is carried out for 12-30 hours.

* * * * *